US008893270B1

(12) United States Patent
Yang et al.

(10) Patent No.: US 8,893,270 B1
(45) Date of Patent: Nov. 18, 2014

(54) DETECTION OF CROSS-SITE REQUEST FORGERY ATTACKS

(75) Inventors: Shun-Fa Yang, Taipei (TW); Wen-Tien Liang, Taoyuan (TW); Hsin-Hsin Kuo, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1986 days.

(21) Appl. No.: 12/011,877

(22) Filed: Jan. 29, 2008

(51) Int. Cl.
*G06F 11/00* (2006.01)

(52) U.S. Cl.
USPC .............................................. 726/22; 726/25

(58) Field of Classification Search
CPC ..... H04L 67/02; H04L 63/1441; H04L 63/20; G06F 21/577; G06F 21/554
USPC ..................................................... 726/22, 25
See application file for complete search history.

(56) References Cited

U.S. PATENT DOCUMENTS

2009/0119769 A1* 5/2009 Ross et al. ...................... 726/13

OTHER PUBLICATIONS

Jovanovic (2006).Preventing cross site request forgery attacks. In Proccedings of the IEEE International Conference on Security and Privacy for Emerging Areas in Communication Networks (Securecomm), Aug. 2006.*

Esse Burns, "Cross Site Reference Forgery, An Introduction to a common web application weakness ", 2005, 9 pages, Information Security Partners LLC, webpage [online], retrieved from the internet: www.isecpartners.com/documents/XSRF_Paper.pdf.
HTTP/1.1: Header Field Definitions. pages 1-39, [retrieved on Jan. 18, 2008], retrieved from the internet: http://www.w3.org/Protocols/rfc2616/rfc2616-sec14.html.
Cross-site request forgery—Wikipedia, the free encyclopedia, pp. 1-3, [retrieved on Jan. 18, 2008], retrieved from the internet: http://en.wikipedia.org/wiki/Cross-site_request_forgery.
Hypertext Transfer Protocol—Wikipedia, the free encyclopedia, pp. 1-7, [retrieved on Jan. 18, 2008], retrieved from the internet: http://en.wikipedia.org/wiki/HTTP.

* cited by examiner

*Primary Examiner* — Brian Shaw
(74) *Attorney, Agent, or Firm* — Okamoto & Benedicto LLP

(57) ABSTRACT

Methods and apparatus for detecting cross-site request forgery (CSRF) attacks include a CSRF detector that analyzes HTTP communications for information indicative of a CSRF attack. The CSRF detector may analyze HTTP responses from a website for CSRF code that automatically performs unauthorized access of an online account of a user of a user computer upon receipt and execution of the CSRF code in the user computer. The CSRF detector may also analyze HTTP requests from a web browser for information indicative of a CSRF attack.

15 Claims, 5 Drawing Sheets

DETECTION OF CROSS-SITE REQUEST FORGERY ATTACKS

BACKGROUND OF THE INVENTION

1. Field of the Invention

The present invention relates generally to computer security, and more particularly but not exclusively to methods and apparatus for detecting computer attacks.

2. Description of the Background Art

Cross-site request forgery ("CSRF") is a type of computer attack where unauthorized transmissions are sent from a user computer to access websites that trust the user. The transmissions resulting from a CSRF attack are "unauthorized" in that the user has not authorized or initiated the transmissions and is not even aware that the transmissions were sent out from his computer. The unauthorized transmissions may involve unauthorized access of a user's online account. FIG. 1 shows a flow diagram schematically illustrating an example CSRF attack.

A CSRF attack may begin with a hacker or other malicious individual introducing CSRF code in a legitimate website 170 that the user visits (arrow 161). The CSRF code may comprise computer-readable program code that automatically performs unauthorized access of an online account upon receipt and execution in the victim user computer. A user employing a web browser 173 may request a web page from the website 170 (arrow 162). In response, the website provides the web page (arrow 163), which may include the CSRF code. When the CSRF code is received and executed in the user's computer, the CSRF code sends unauthorized transmissions to access the user's online account in the website 171 (arrow 164). For example, the CSRF code may comprise the following script:

<Img src=http://somebank.com/transferfunds.asp?amnt=10000&acc=someone> where "somebank.com" is the domain of the website 171. If the user keeps authentication information for the website 171 in a cookie, and if the cookie has not expired, the script will transfer funds out of the user's account without the user's approval when the script is executed in the user's computer.

A popular technique of guarding user computers from websites that contain malicious codes is to consult a web reputation service. The web reputation service maintains a database of malicious websites. The use of a web reputation service, however, is ineffective against CSRF attacks because the website serving the CSRF code is typically a legitimate website. Also, a typical web reputation service cannot provide real-time protection from CSRF attacks because it is difficult to update a reputation database fast enough to include newly compromised websites.

SUMMARY

In one embodiment, methods and apparatus for detecting cross-site request forgery (CSRF) attacks include a CSRF detector that analyzes HTTP communications for information indicative of a CSRF attack. The CSRF detector may analyze HTTP responses from a website for CSRF code that automatically performs unauthorized access of an online account of a user of a user computer upon receipt and execution of the CSRF code in the user computer. The CSRF detector may also analyze HTTP requests from a web browser for information indicative of a CSRF attack.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 2:
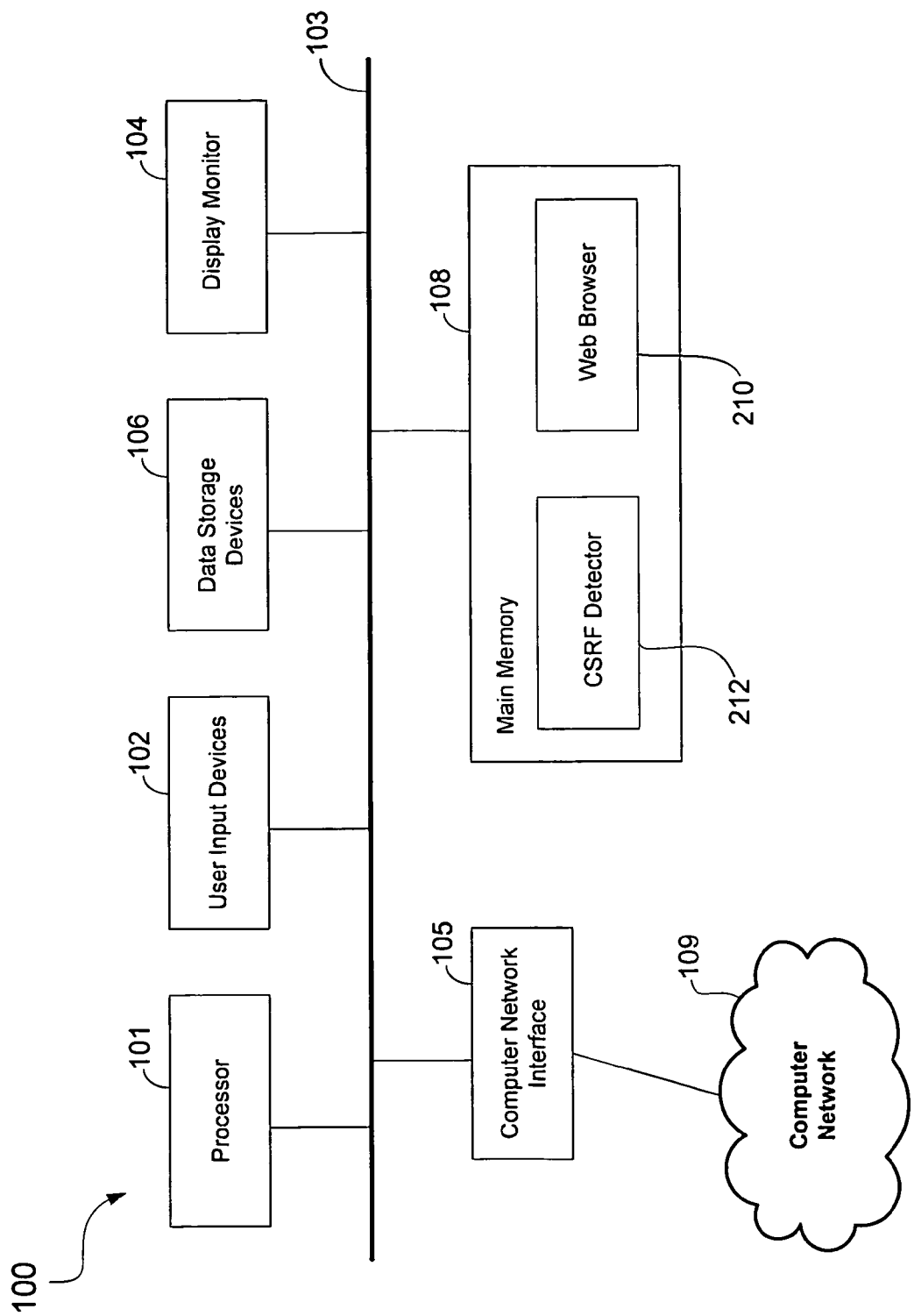
FIG. 2 shows a schematic diagram of a computer in accordance with an embodiment of the present invention.

Referring now to FIG. 2, there is shown a schematic diagram of a computer 100 in accordance with an embodiment of the present invention. The computer 100 may be employed as a user computer or a gateway computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

Figure 1:
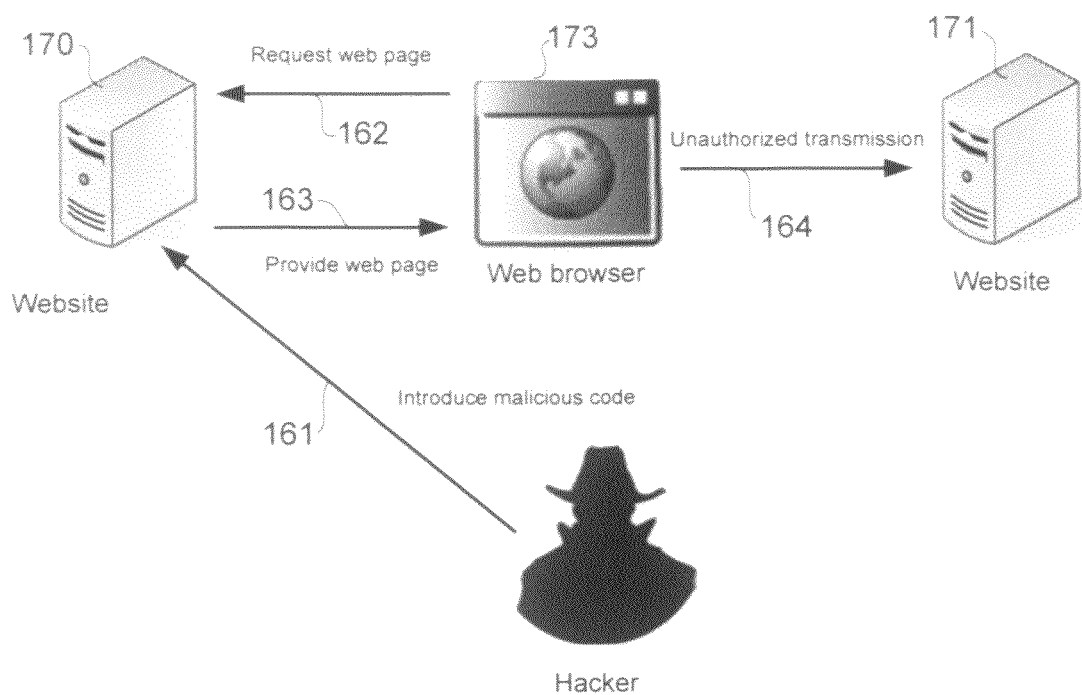
FIG. 1 shows a flow diagram schematically illustrating a CSRF attack.

In the example of FIG. 1, the main memory 108 includes a web browser 210 and a cross-site request forgery (CSRF) detector 212. The web browser 210 and the detector 212 may be loaded from the data storage device 106 to the main memory 108 for execution by the processor 101.

The web browser 210 may comprise a commercially available web browser, such as the Microsoft Internet Explorer™ web browser.

The CSRF detector 212 may comprise computer-readable program code for detecting a CSRF attack. In one embodiment, the detector 212 is configured to intercept HTTP communications to and from the web browser 210. For example, the CSRF detector 212 may be configured as a local proxy for the web browser 210.

The detector 212 may be configured to receive and analyze HTTP (hypertext transfer protocol) communications, such as HTTP requests and responses, to and from the web browser 212 for information indicative of a CSRF attack. In one embodiment, the detector 212 detects a CSRF attack by looking for CSRF code in an HTTP response from a website. CSRF code comprises computer-readable program code, such as an HTML tag or script, that automatically performs unauthorized access of an online account on a website or server computer upon execution in the victim user computer. For example, the detector 212 may check the HTTP response for inconsistency, such as program code that supposedly gets an image from a website but actually does not. The detector 212 may detect a CSRF attack by looking for CSRF code in an HTTP request from a user computer. For example, the detector 212 may check the HTTP request for inconsistency, such as whether the type of content expected to be received by the web browser as indicated in the request matches the content that will be provided to the web browser.

Figure 3:
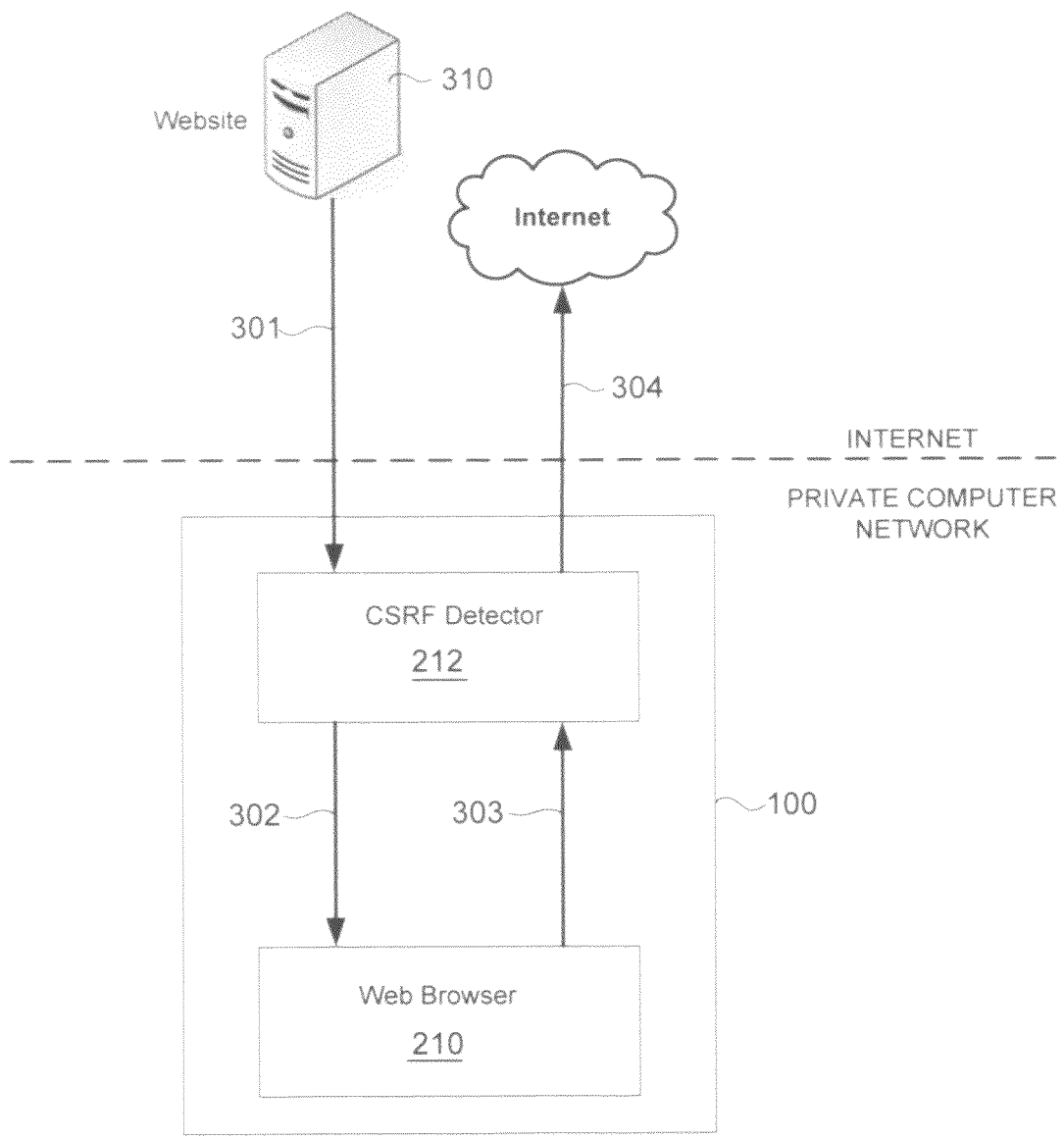
FIG. 3 shows a flow diagram schematically illustrating detection of a CSRF attack in accordance with an embodiment of the present invention.

FIG. 3 shows a flow diagram schematically illustrating detection of a CSRF attack in accordance with an embodiment of the present invention. In the example of FIG. 3, a user of the computer 100 employs the web browser 210 to request a web page from a website 310 in accordance with HTTP. The website 310, which runs on a web server computer, sends a corresponding HTTP response (arrow 301), which in this example includes a web page. The CSRF detector 212 receives the HTTP response and analyzes the HTTP response for information indicative of a CSRF attack, such as presence of CSRF code. In this example, the detector 212 checks the HTTP response for malicious HTML tags. A malicious HTML tag purports to get or be a particular type of content but actually gets or is something else. An example malicious HTML tag is an HTML image tag, <Img src=URL> where the URL (uniform resource locator) should be for an image file, such as a .jpg or .gif file, as indicated by the tag "Img src." For example, the URL http://tw.i4.yimg.com/i/tw/hp/spirit/yahoo_logo.gif is for an image file as indicated by the .gif extension of "yahoo_logo.gif."

If the URL is for a content other than an image (e.g., a script), the detector 212 may deem the HTML image tag to be CSRF code and terminate the connection with the website 310. For example, the detector 212 may block communications to and from the website 310 and inform the user by providing a warning web page to the web browser 210.

If the HTTP response from the website 310 does not have any information indicative of a CSRF attack, the detector 212 may forward the HTTP response to the web browser 210 (arrow 302).

The web browser 210 may send an HTTP request to a website on the Internet (arrow 303). The HTTP request may be initiated by program code from the web page received from the website 310 or due to the user's navigation to another website. The detector 212 receives the HTTP request from the web browser 210 and analyzes the HTTP request for information indicative of a CSRF attack. In this example, the detector 212 examines the accept header field of the HTTP request to look for any inconsistency. The accept header field of an HTTP request indicates the type of content acceptable as a response to the HTTP request. If the web browser 210 is rendering an image tag as indicated by the corresponding HTTP response previously received by the web browser 210, the detector 212 may expect the accept header of the HTTP request to indicate an image.

As a particular example, the detector 212 operating as a local proxy for the web browser 210 may detect an HTTP request that the web browser 210 just sent. The HTTP request header includes an accept header field, which indicates the type of content the web browser 210 wants to retrieve by the HTTP Request. The following HTML request shows an example where the web browser 210 wants to retrieve a .gif image file:

http://tw.i4.yimg.com/i/tw/hp/spirit/yahoo_logo.gif
the browser will sent the following HTTP Request,
GET /i/tw/hp/spirit/yahoo_logo.gif HTTP/1.1
Host: tw.i4.yimg.com
User-Agent: Mozilla/5.0 (Windows; U; Windows NT 5.1; zh-TW; rv:1.8.1.7) Gecko/20070914 Firefox/2.0.0.7
Accept: image/gif
Accept-Language: zh-tw,en-us;q=0.7,en;q=0.3
Accept-Encoding: gzip,deflate
Accept-Charset: Big5,utf-8;q=0.7,*;q=0.7
Keep-Alive: 300
Connection: keep-alive In the above example, the accept header field indicates an image/gif type content, which is an image. If the web browser 210 is rendering an HTML image tag and requesting content other than an image file type, the detector 212 may deem the HTTP request to be part of a CSRF attack. In that case, the detector 212 may block the HTTP request and so inform the user by providing a notification web page to the web browser 210.

If the HTTP request does not include information indicative of a CSRF attack, the detector 212 may forward the HTTP request to its destination on the Internet (arrow 304).

Figure 4:
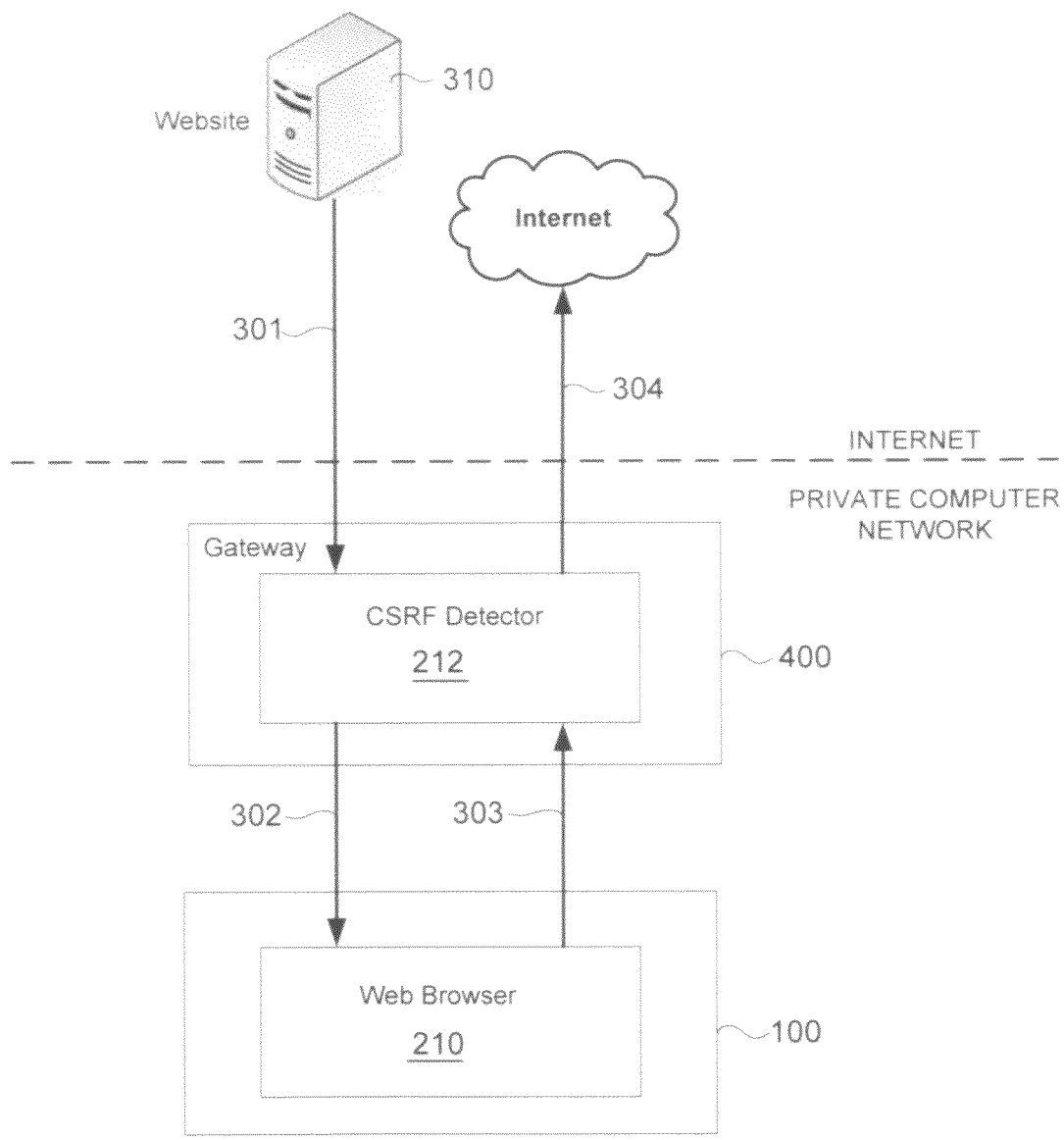
FIG. 4 shows how the components of FIG. 3 may be implemented in separate computers in accordance with an embodiment of the present invention.

In the example of FIG. 3, the web browser 210 and the CSRF detector 212 both run on the computer 100 in a private computer network. As can be appreciated, the detector 212 may also be run in a computer separate from the web browser 210. For example, as shown in FIG. 4, the detector 212 may be running in a computer 400 serving as an Internet gateway for the private computer network. Accordingly, HTTP communications between the Internet and the private computer network go through the computer 400, where the detector 212 runs to check HTTP responses and requests for CSRF attack. In the example of FIG. 4, the computer 100 serves as a user computer running the web browser 210. HTTP communications between the web browser 210 and a website on the Internet are intercepted by the detector 212 in the computer 400. The operation of the detector 212 is otherwise the same as explained with reference to FIG. 3.

Figure 5:
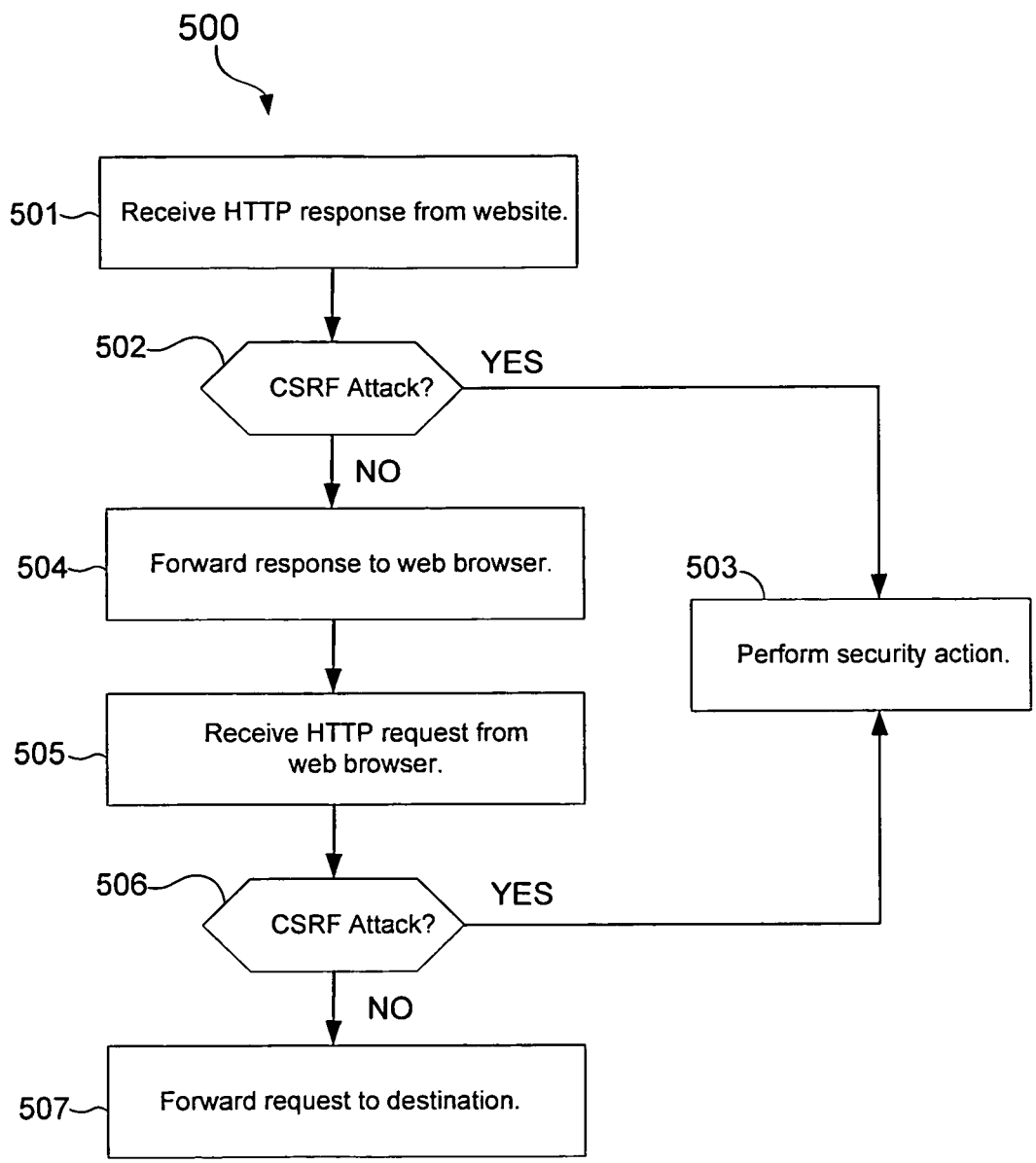
FIG. 5 shows a flow diagram of a method of detecting a CSRF attack in accordance with an embodiment of the present invention.

FIG. 5 shows a flow diagram of a method 500 of detecting a CSRF attack in accordance with an embodiment of the present invention. The method 500 is explained using the components shown in FIGS. 2-4 for illustration purposes only. Other components may also be used without detracting from the merits of the present invention.

In the example of FIG. 5, the CSRF detector 212 receives an HTTP response from a website (step 501). The HTTP response may be responsive to a request for a web page previously sent to the website by the web browser 210. The detector 212 analyzes the HTTP response to detect a CSRF attack (step 502). For example, the detector 212 may be configured to detect a CSRF attack by looking for CSRF code in the HTTP response. The detector 212 performs a security action if the detector 212 detects a CSRF attack based on its analysis of the HTTP response (step 502 to step 503). The security action may involve blocking communications with the website and/or informing the user by way of a notification web page, for example. Otherwise, if the detector 212 does not detect a CSRF attack from the HTTP response, the detector 212 forwards the HTTP response to the web browser 210 (step 502 to step 504).

At a later time, the detector 212 receives an HTTP request from the web browser 210 (step 505). The HTTP request may be for the same website from which the HTTP response was received (see step 501) or for another website. The detector 212 analyzes the HTTP request to detect a CSRF attack (step 506). The detector 212 performs a security action if the detector 212 detects a CSRF attack based on its analysis of the HTTP request (step 506 to step 503). Otherwise, if the detector 212 does not detect a CSRF attack from the HTTP request, the detector 212 forwards the HTTP request to its destination computer on the Internet (step 506 to step 507).

An effective method and apparatus for detecting CSRF attacks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of detecting a cross-site request forgery (CSRF) attack, the method comprising:
   receiving an HTTP (Hypertext Transfer Protocol) response from a website, the HTTP response being responsive to a request for a web page previously submitted from a user computer to the website;
   analyzing the HTTP response for presence of CSRF code by determining whether a type of content expected to be received by a web browser running in the user computer is consistent with content that will be provided to the web browser, the CSRF code comprising computer-readable program code which automatically accesses an online account of a user of the user computer upon receipt and execution of the CSRF code in the user computer without authorization from the user;
   performing a security action when the CSRF code is found in the HTTP response;
   receiving an HTTP request from the web browser;
   analyzing the HTTP request for information indicative of a CSRF attack; and
   performing the security action when the HTTP request includes information indicative of the CSRF attack.

2. The method of claim 1 further comprising:
   forwarding the HTTP response to the web browser running in the user computer when the CSRF code is not found in the HTTP response.

3. The method of claim 1 further comprising:
   forwarding the HTTP request to a destination computer when the HTTP request does not include information indicative of the CSRF attack.

4. The method of claim 1 wherein the security action comprises blocking communication to and from the website.

5. The method of claim 1 wherein the CSRF code comprises an HTML image tag that retrieves content that is not an image file.

6. The method of claim 1 wherein the CSRF code comprises a script.

7. The method of claim 1 wherein analysis of the HTTP response for presence of the CSRF code is performed in the user computer.

8. The method of claim 1 wherein analysis of the HTTP response for presence of the CSRF code is performed in another computer separate from the user computer.

9. A computer having memory and a processor for executing computer-readable program code in the memory, the memory comprising:
   a cross-site request forgery (CSRF) detector comprising computer-readable program code, wherein the CSRF detector detects a CSRF attack that automatically performs an unauthorized access of an online account of a user of a user computer when CSRF code is received and loaded in the user computer, the CSRF detector being configured to:
   detect presence of the CSRF code in an HTTP (Hypertext Transfer Protocol) response sent by a website to the user computer by determining whether a type of content expected to be received by a web browser running in the user computer is consistent with content that will be provided to the web browser,
   receive an HTTP request from the web browser,
   analyze the HTTP request for information indicative of the CSRF attack, and
   perform a security action when the CSRF code is found in the HTTP response,
   and perform the security action when the HTTP request includes information indicative of the CSRF attack.

10. The computer of claim 9 wherein the computer comprises a gateway computer.

11. The computer of claim 9 wherein the CSRF detector is configured to forward the HTTP response to the web browser running in the user computer when the CSRF code is not found in the HTTP response.

12. The computer of claim 9 wherein the CSRF detector is configured to forward the HTTP request to a destination computer when the HTTP request does not include information indicative of the CSRF attack.

13. The computer of claim 9 wherein the security action comprises blocking communication to and from the website.

14. The computer of claim 9 wherein the CSRF code comprises an HTML image tag that retrieves content that is not an image file.

15. The computer of claim 9 wherein the computer is a user computer.

* * * * *